Feb. 13, 1968   T. D. H. ANDREWS   3,368,630
TRACTOR POWER LIFT CONTROL

Filed Jan. 5, 1965   2 Sheets-Sheet 1

INVENTOR
THOMAS D. H. ANDREWS
BY
Orland M. Christensen
ATTORNEY

INVENTOR
THOMAS D. H. ANDREWS
BY
Orland M. Christensen
ATTORNEY united States Patent Office 3,368,630
Patented Feb. 13, 1968

3,368,630
TRACTOR POWER LIFT CONTROL
Thomas D. H. Andrews, Cheltenham, England, assignor to Dowty Hydraulic Units Limited, Cheltenham, England, a British company
Filed Jan. 5, 1965, Ser. No. 423,551
Claims priority, application Great Britain, Jan. 16, 1964, 2,009/64
10 Claims. (Cl. 172—7)

ABSTRACT OF THE DISCLOSURE

A tractor provided with a power lift and a plough-carrying hitch linkage operable by the power lift, includes a variable-delivery pump of relatively low delivery rate and a fixed-displacement pump of relatively high delivery rate, both pumps being connectable to the power lift.

For operation under draft and slow positional control, only the variable-delivery pump is operable, a control valve isolating the fixed displacement pump from the power lift.

When the control valve is opened the delivery of the second pump supplements the delivery of the first pump so that the power lift is operable at relatively fast rate.

---

This invention relates to tractors and like agricultural vehicles.

According to this invention, a tractor, or like agricultural vehicle, has a liftable implement, such as a plough, the draft of which, when in a lowered position can be controlled, the means for lifting and controlling draft being hydraulically-operable and suppliable with liquid from a pump, and the flow of liquid from that pump being supplementable under certain conditions of operation, by the flow of liquid from a second pump.

The pump normally for supplying liquid to the means for lifting and controlling draft can have a low delivery rate and the pump used under certain conditions for supplementing the flow can have a higher delivery rate.

The two pumps may be separate, or alternatively, may be arranged in a single casing and driven by a common driving shaft.

One of the pumps may be of variable-delivery type, while the other may be of fixed-displacement type.

The pump delivering at low delivery rate may be the one of variable-delivery type, and during slow positional response and/or draft control only, the delivery from the said other pump by-passes to drain.

The fixed-displacement pump may be of gear type, while the variable-delivery pump may be of radial-piston, or axial-piston type.

The pumps may be so arranged that for slow positional response and/or draft control of the implement, only pressure liquid delivered by that pump supplying at relatively low delivery rate is utilized, but for fast lifting operation of the implement, the pumps may together be arranged to supply liquid at relatively high flow rate.

The means for lifting the implement and for controlling draft may include a single jack operable at slow and fast rates.

Two feed-back linkages may be associated with said jack, one being operable under positional control of the implement, whilst the other is inoperative, and the said other feed-back linkage being operable under draft control whilst the said one feed-back linkage is inoperative, change-over means being provided to render effective either one or other of these feed-back linkages, thereby to determine the mode of operation.

One embodiment of the invention will now be particularly described, with reference to the accompanying drawings, of which:

Figure 1:
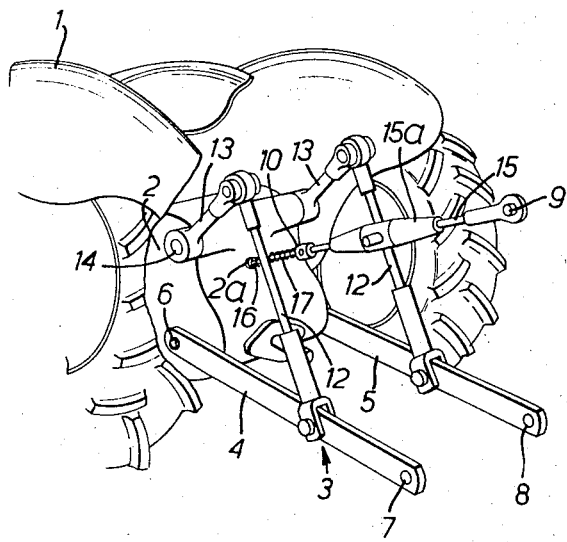
FIGURE 1 shows part of a tractor and its hitch linkage.

Referring to the drawings, a tractor 1 carries at the rearward end portion of its casing 2 a three-point hitch linkage 3 by which an agricultural implement such as a plough (not shown) can be borne by the tractor. The hitch linkage 3 comprises a pair of lower or tension links 4 and 5 which are pivotally mounted at one end portion, as at 6, to the casing 2. Provision for pivotal connection of these two links 4 and 5 to the implement structure is made at 7 and 8 respectively.

The hitch linkage is operable under the control of a jack 11 housed within the casing 2, suspensory links 12 connecting the lower links 4 and 5 respectively to a pair of lift arms 13 splined upon a rocking shaft 14 at either end portion thereof. The rocking shaft is journalled in the casing 2 and lies transversely of the vehicle.

Figure 2:
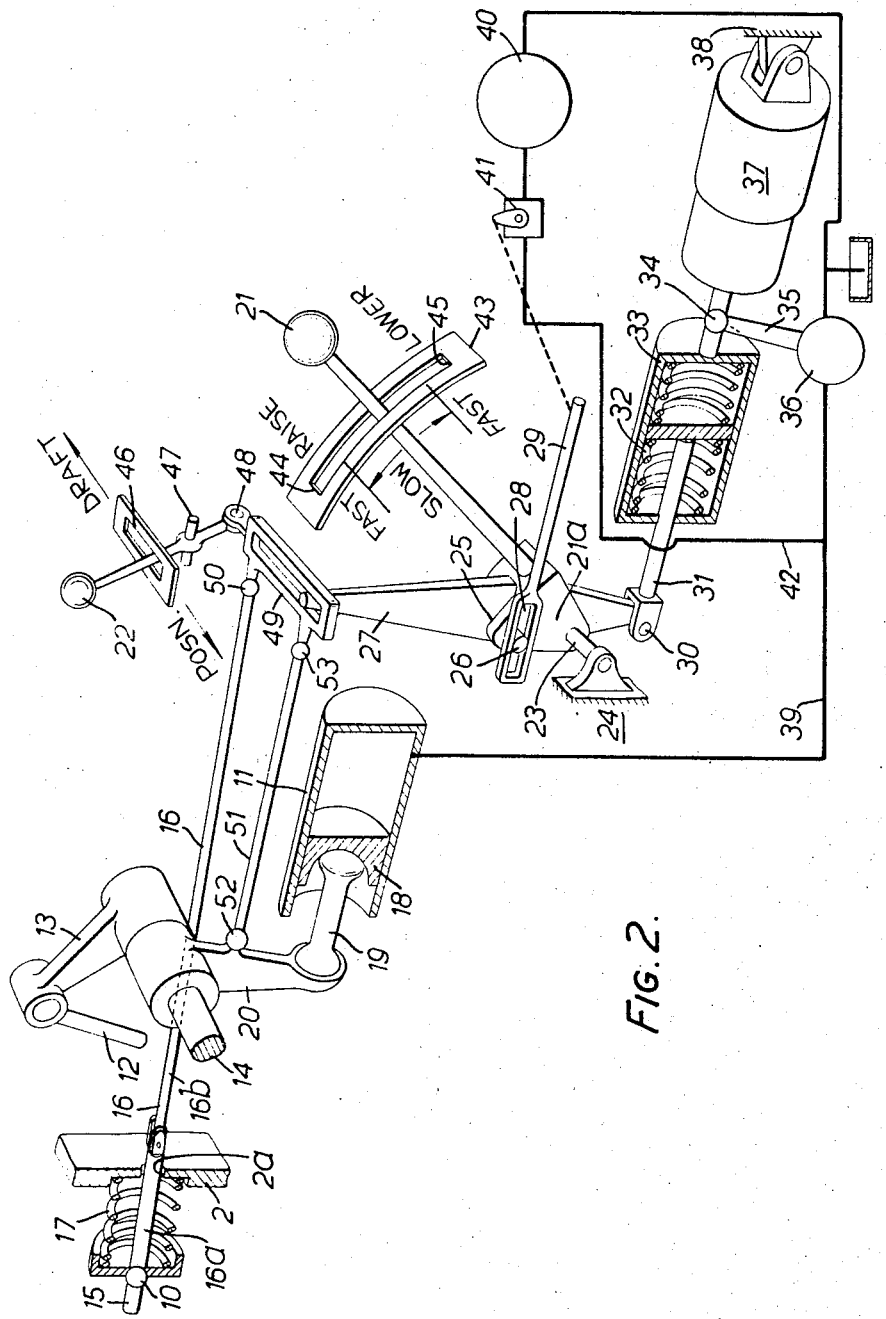
FIGURE 2 shows a draft and positional control system associated with the tractor partly shown in FIGURE 1.

The hitch linkage also includes a single upper compression link 15 pivotally connectible at 9 at one end portion to the implement structure and pivotally connected at 10 at its other end portion to a feedback link 16 comprising two parts 16a and 16b pivotally connected together. The link 16 passes through an aperture 2a, formed in the casing 2, to the interior thereof where it connects with mechanism shown more particularly in FIGURE 2.

Externally of the casing 2, the link 16 is co-operable in known manner with a draft control balance spring 17. The link 15 has a length-adjusting turn-buckle 15a provided in it.

The jack 11 is operable for positional control of the plough in relation to the ground, and also for draft control of the plough so that if, during ploughing, heavier soil is met or some obstruction which increases the drag upon the tractor, the depth of penetration by the plough is automatically reduced, but increased again subsequently as and when lighter soil is re-encountered.

The piston 18 of the jack 11 is connected by means of its piston rod 19 to a lever 20 keyed to the rocking shaft 14 so that with contraction and extension of the jack, angular displacement of the rocking shaft 14 occurs with consequent lifting or lowering of the lift arms 13 for appropriate control of the plough.

The positional and draft control system includes two control levers 21 and 22. The main control lever 21 is provided with a base block 21a itself pivotally mounted at 23 to a fixed part 24 of the tractor. The base block is cut-away at 25 in order pivotally to support, at 26, a lever 27. The pivot pin 26 engages a slot 28 formed in a valve-operating rod 29. The lower end portion of the lever 27 is pivotally connected at 30 to one member 31 of a spring-box device 32. The other member 33 of the spring-box device is pivotally connected at 34 to the delivery-varying lever 35 of a relatively small variable-delivery pump 36. A shock-absorbing device 37 is interposed between the pivotal connection 34 and another fixed part 38 of the tractor structure.

The variable delivery pump 36, when in an on-stroke condition, delivers pressure liquid through a conduit 39 to the cylinder of the jack 11. A fixed-displacement pump 40 is also provided in the system, this pump being of somewhat larger capacity than the variable delivery pump. The operation of the fixed-displacement pump is under the control of a valve 41 operable by the rod 29. When this pump is operative, pressure liquid is delivered through a conduit 42 which connects with the conduit 39 a short distance downstream of the variable-delivery pump 36.

The lever 21 is displaceable in a quadrant 43 and, as drawn, is in its intermediate position. The lever is displaceable in either direction from the intermediate position, for respectively raising or lowering the plough, in a first band appropriate to slow operation of the jack. When the lever 21 is moved towards either extremity 44 or 45 in its quadrant, these two end zones are appropriate to fast raising or lowering of the jack 11, the precise method of operation being hereinafter described.

The lever 22 is displaceable in a slot 46 from a position appropriate to positional control of the jack 11 to a position at the other end of the slot appropriate to draft control of the plough.

The lever 22 is pivotally mounted at 47 to a fixed part of the tractor structure, and at the end portion thereof remote from the handle is connected by a universal joint 48 to a rectangular pivot slide 49. The upper end portion in the drawing of the lever 27 engages the slide 49, the latter being displaceable horizontally with respect thereto upon displacement of the lever 22.

The feed-back link 16 pivotally connects at 50 to the slide 49, while a further feed-back link 51 is provided, this being universally connected at 52 to the lever 20 and at its opposite end being universally connected at 53 to the slide 49.

The variable-delivery pump 36 is of radial-piston type, while the fixed displacement pump is of gear type, the two pumps being arranged in a manner not shown side-by-side in a substatnially common casing, and being driven from the engine of the tractor through a common driving shaft (also not shown).

In operation of the tractor, when it is desired to operate the plough under positional control, that is for raising or lowering it away from or towards the ground after or before draft control, the lever 22 is positioned to the left in the drawing in its slot 46 so that the feed-back link 51 is effective upon the lever 27.

For raising the plough slowly, the lever 21 is moved upwardly in the drawing in the slow speed zone of the quadrant 43, the base block 21a in moving with the lever about its pivotal axis 23 carrying the lever 27 to the left in the drawing. Under slow speed operation, the pivot 26 moves in the slot 28 but has no displacing effect upon the valve-operating rod 29. However, by virtue of the connection of the lever 27 through the spring-box 32 to the delivery-varying lever 35 of the variable delivery pump 36, the latter is brought on-stroke to deliver pressure liquid to the cylinder of the jack 11. Consequent displacement of the piston 18 effects clockwise rotation of the lever 20 and thus of the rocking shaft 14 and lift arms 13 so that the plough is lifted. The feed-back link 51 simultaneously effects angular displacement in a horizontal plane of the slide valve 49 about the universal connection 48 to the base of the lever 22, and in this way readjusts the lever 27 in an anti-clockwise sense so that the delivery-varying lever 35 of the variable delivery pump 36 is readjusted to a position where the pump causes no further upward movement of the jack, but nevertheless maintains the plough in that raised position, as required by the extent of movement of the lever 21.

Under these conditions, the fixed displacement pump 40 does not supply pressure fluid into the plough operating system but instead, since it is being driven with the variable-delivery pump, its delivery is bypassed to drain in a manner not shown.

However, if upon raising of the plough, the speed of raising is required to be fast, the lever 21 is moved into the fast-operating range in its quadrant 43, whereupon the pin 26 abuts the left-hand end in the drawing of the slot 28 to displace the valve rod 29 to the left, this opening the valve 41 so that the fixed-displacement pump 40 is brought into effective operation. Pressure liquid from this pump is delivered through the conduit 42 into the conduit 39, and this supplemental pressure liquid thereby directed into the jack 11 is such as to cause a faster operation of the jack. In this case as soon as the required position of the plough is reached, the feed-back link 51 again adjusts the lever 27 in an anti-clockwise sense about the pivot 26 so that the valve 41 of the fixed displacement pump 40 is permitted to close simultaneously with the delivery-reducing movement of the lever 35 of the variable-delivery pump 36.

When it is required to lower the plough at either slow or fast speeds, the system operates in the converse sense, the lever 21 being moved downwardly in its quadrant, this having the effect of cancelling the holding pressure in the jack 11 and permitting its escape, either at a slow rate or at a fast rate, to drain. For fast rate, the rod 29 is caused to operate the valve 41, so that the conduits 39 and 42 are directly communicated with drain.

When it is required to operate the plough under draft control, the plough is caused to engage the sail to a required depth under positional control of the jack 11. The lever 22, which with the slide 49 forms change-over means, is then moved to the right in the drawing in its slot 46 to the draft position, the slide 49 being displaced to the left in the drawing so that change-over occurs whereby it is the feed-back link 16 which is now effective upon the upper end portion of the lever 27 instead of the link 51.

If, during the ploughing operation, heavy soil or some form of obstruction is met, the plough-controlling linkage is such that the top link 15 thereof is displaced in a manner as to increase the compression in the balance spring 17 and thus displace the feed-back link 16. Hence, the slide 49 is displaced in an anti-clockwise direction about its universal connection 48 to the lever 22, the lever 27 thus being displaced in a clockwise direction about its pivot 26. In this way the delivery-varying lever 35 of the variable-delivery pump 36 is displaced in an anti-clockwise direction so as to bring this pump into operation for extension of the jack 11, and thus for raising of the plough to an extent dependent upon the amount of movement of the top link 15. Thereafter, when lighter soil is re-encountered the draft control means ensures that the original ploughing depth is restored.

If, however, an obstruction is so effective upon the plough that trip valve means (not shown, but provided in association with the balance spring 17), are operated upon full compression of the balance spring 17 at the extreme condition of the top link 15, then the jack 11 is vented to drain so that the system becomes fully lowered. Under these conditions the geometry of attachment of the plough is such that the rear wheels of the tractor will spin and thus before continuing the ploughing operation it will be necessary for the driver to take the necessary steps manually to release the obstructed plough.

A stop means (not shown) is provided upon the quadrant 44. This stop means is pre-settable for the desired implement datum depth. Thus, when it is required to turn the tractor and implement around, for example before ploughing a new furrow, the lever 21 is moved away from this stop means into the fast raise position. Following turn-around, the lever is moved back onto the stop means whereupon the implement returns to the originally-set implement datum depth.

Following normal operation of the plough under draft control, when it is desired to revert to positional control for complete lifting of the plough away from the ground, for example when the tractor is required to travel away from the ploughing area and along a road, the lever 22 is moved from its draft setting to its positional setting whereupon the lever 21 is moved to the fast raise position.

The spring box device 32 and the device 37 are provided to absorb such vibrations in the operation of the tratcor which might otherwise give rise to oscillation of the lever 35 and consequent fluctuating output and movement of the jack 11.

By the invention a small variable delivery pump provides sufficient pressure liquid for slow operation of the jack and also for draft control, but when fast operation of the jack under positional control is required, the fixed displacement pump is brought into operation to supplement the delivery of the variable delivery pump. In this way the disadvantages in the use of one single and large pump for draft control, slow operation and fast operation, such disadvantages being in the form of overheating and instability (evident upon such single pump providing pressure liquid only for draft control and slow operation), are avoided.

In another embodiment of the invention, the arrangement described is additionally provided with means for the visual control of the jack-powered implement.

I claim as my invention:

1. A tractor or like agricultural vehicle having a fluid-pressure-operable power lift, a hitch linkage carried upon the vehicle, and an implement, for example a plough, carried by the hitch linkage, wherein the improvement comprises the provision of:
   (a) a first pump of variable-delivery type so constructed as to have a low delivery rate,
   (b) a second pump of fixed-displacement type and so constructed as to have a relatively high delivery rate,
   (c) first conduit means connecting the fluid outlet of the first pump to said power lift,
   (d) second conduit means for directing the delivery of the second pump into the first conduit means, and,
   (e) a control valve in said second conduit means, which when closed isolates the second pump from the power lift so that the power lift can be operated by the first pump only for slow positional response or draft control of the implement, while the delivery from the second pump by-passes to drain, but which valve, when open, enables pressure fluid delivered by the second pump to pass into the first conduit means to supplement the pressure fluid delivered by the first pump thus to cause the power lift to operate at relatively fast rate.

2. In combination, a vehicle having a hitch thereon for carrying an agricultural implement therewith, and an operating mechanism for controlling the hitch comprising a fluid pressure operated power lift for the hitch, means including a pair of pumps hydraulically interconnected with the power lift to cause the lift to vary the setting of the hitch, said pumps having a common shaft, but separate deliveries therefrom, and the displacement of one of the pumps being fixed while the displacement of the other is variable, means including a two-position pump control for varying the delivery of the variable displacement pump, said pump control being operative in one position thereof to cause the variable displacement pump to deliver fluid to the power lift at a relatively low rate, and operative in the other position thereof to cause the variable displacement pump to deliver fluid to the power lift at a relatively high rate, and means operative to dump the delivery of the fixed displacement pump to reservoir when the pump control is in the aforesaid one position thereof, but responsive to selection of the other position of the pump control to direct the delivery of the fixed displacement pump to the power lift, to supplement the delivery of the variable displacement pump.

3. The combination according to claim 2 wherein the operating mechanism also includes a feed-back mechanism responsive to variation in the setting of the hitch to alter fluid flow in the interconnection between the pumps and the power lift, for draft or positional control of the hitch, and means for converting the feed-back mechanism from draft control to positional control, or vice versa.

4. The combination according to claim 3 wherein the feed-back mechanism is operatively interconnected with the pump control to vary the delivery of the variable displacement pump.

5. The combination according to claim 3 wherein the hitch has two links, one of which is connectable with the implement for positional control, and the other of which is connectable with the implement for draft control, and wherein the feed-back mechanism includes a separate feed-back means for each link, said feed back conversion means being operative to convert the feed-back mechanism from control by one feed-back means to the other, and vice versa.

6. A tractor as claimed in claim 1, wherein the two pumps are arranged in a single casing and are given by a common driving shaft.

7. A tratcor as claimed in claim 1, wherein the fixed-displacement pump is of gear type, while the variable-delivery pump is of radial-piston type.

8. A tractor as claimed in claim 1, wherein the power lift comprises a single telescopic jack.

9. A tractor as claimed in claim 8, wherein two feed-back linkages are associated with said jack, one being operable under positional control of the implement, whilst the other is inoperative, and the said other feed-back linkage is operable under draft control whilst the said one feed-back linkage is inoperative, change-over means being provided to render effective either one or the other of these feed-back linkages, thereby to determine the mode of operation.

10. A tractor as claimed in claim 9, wherein the said change-over means comprises a manually-controllable slide co-operable with a feed-back lever by which neutralisation of the setting of a main control lever is afforded upon the jack reaching a selected position, the slide being so displaceable with respect to the feed-back lever as to render it responsive in its feed-back movement to either the movement of the said one or the other feed-back linkage.

References Cited

UNITED STATES PATENTS

| | | | |
|---|---|---|---|
| 1,932,761 | 10/1933 | West | 60—52 X |
| 3,002,571 | 10/1961 | Kersey et al. | 172—9 |
| 3,183,977 | 5/1965 | Heckenkamp et al. | 172—7 |

ABRAHAM G. STONE *Primary Examiner.*

WILLIAM A. SMITH III, *Examiner.*

J. R. OAKS, *Assistant Examiner.*

UNITED STATES PATENT OFFICE
CERTIFICATE OF CORRECTION

Patent No. 3,368,630                                         February 13, 1968

Thomas D. H. Andrews

It is hereby certified that error appears in the above numbered patent requiring correction and that the said Letters Patent should read as corrected below.

Column 4, line 17, for "sail" read -- soil --; line 72, for "tratcor" read -- tractor --; column 6, line 26, for "given" read -- driven --; line 28, for "tratcor" read -- tractor --.

Signed and sealed this 3rd day of June 1969.

(SEAL)
Attest:

Edward M. Fletcher, Jr.

Attesting Officer

Commissioner of Patents